US010227512B2

(12) United States Patent
Arango

(10) Patent No.: US 10,227,512 B2
(45) Date of Patent: Mar. 12, 2019

(54) MULTI-PURPOSE ADHESIVES AND METHODS OF MAKING AND USING THEREOF

(71) Applicant: Rainforest Technologies, LLC, Las Vegas, NV (US)

(72) Inventor: Juan Arango, Chatsworth, GA (US)

(73) Assignee: Rainforest Technologies, LLC, Las Vegas, NV (US)

(*) Notice: Subject to any disclaimer, the term of this patent is extended or adjusted under 35 U.S.C. 154(b) by 0 days.

(21) Appl. No.: 15/201,864

(22) Filed: Jul. 5, 2016

(65) Prior Publication Data

US 2016/0312086 A1 Oct. 27, 2016

Related U.S. Application Data

(62) Division of application No. 12/724,015, filed on Mar. 15, 2010, now abandoned.

(60) Provisional application No. 61/160,472, filed on Mar. 16, 2009.

(51) Int. Cl.
| | |
|---|---|
| *B32B 37/12* | (2006.01) |
| *B32B 27/06* | (2006.01) |
| *C09J 133/08* | (2006.01) |
| *C09J 135/06* | (2006.01) |
| *B32B 37/14* | (2006.01) |
| *E04F 13/08* | (2006.01) |
| *E04F 15/02* | (2006.01) |
| *E04F 15/16* | (2006.01) |
| *C08K 5/00* | (2006.01) |
| *C08L 33/08* | (2006.01) |
| *C08L 35/06* | (2006.01) |

(52) U.S. Cl.
CPC ............ *C09J 133/08* (2013.01); *B32B 27/06* (2013.01); *B32B 37/14* (2013.01); *C09J 135/06* (2013.01); *E04F 13/0887* (2013.01); *E04F 15/02155* (2013.01); *E04F 15/16* (2013.01); *B32B 2255/26* (2013.01); *B32B 2317/04* (2013.01); *B32B 2419/04* (2013.01); *B32B 2607/00* (2013.01); *C08K 5/005* (2013.01); *C08K 5/0016* (2013.01); *C08K 5/0058* (2013.01); *C08L 33/08* (2013.01); *C08L 35/06* (2013.01); *C08L 2205/02* (2013.01); *C08L 2666/04* (2013.01)

(58) Field of Classification Search
CPC ...... B32B 27/06; B32B 37/14; B32B 2607/00; B32B 2419/04; E04F 15/02155; C08L 33/08; C09J 133/08
See application file for complete search history.

(56) References Cited

U.S. PATENT DOCUMENTS

| | | | | |
|---|---|---|---|---|
| 3,723,318 | A | * | 3/1973 | Butler ................. C09K 3/30 252/67 |
| 4,045,517 | A | | 8/1977 | Guerin et al. |
| 4,248,770 | A | | 2/1981 | Matsuo et al. |
| 4,952,650 | A | | 8/1990 | Young et al. |
| 5,154,974 | A | * | 10/1992 | Norman ............. C09J 133/06 428/355 R |
| 5,292,844 | A | | 3/1994 | Young et al. |
| 5,314,944 | A | | 5/1994 | Chao |
| 6,001,912 | A | | 12/1999 | Schneider |
| 6,541,550 | B1 | | 4/2003 | McCarthy et al. |
| 6,667,352 | B1 | | 12/2003 | Kusters et al. |
| 6,686,425 | B2 | | 2/2004 | Wigdorski et al. |
| 6,800,680 | B2 | | 10/2004 | Stark et al. |
| 7,053,152 | B2 | | 5/2006 | Krebs et al. |
| 2004/0031223 | A1 | * | 2/2004 | Durning ............... B32B 13/04 52/309.17 |
| 2004/0091689 | A1 | | 5/2004 | Tosaki et al. |
| 2004/0147663 | A1 | * | 7/2004 | Silvers ................ C09J 121/00 524/501 |
| 2005/0032967 | A1 | | 2/2005 | Roberts et al. |
| 2007/0105982 | A1 | | 5/2007 | Roschmann et al. |
| 2007/0155904 | A1 | | 7/2007 | Chou et al. |
| 2007/0190093 | A1 | | 8/2007 | Atwater et al. |
| 2007/0197686 | A1 | | 8/2007 | Dimanshteyn et al. |
| 2008/0035709 | A1 | | 2/2008 | Nishiura et al. |
| 2008/0152841 | A1 | | 6/2008 | Choi et al. |
| 2010/0055370 | A1 | | 3/2010 | Diehl et al. |

FOREIGN PATENT DOCUMENTS

| | | | | |
|---|---|---|---|---|
| DE | 4228436 | | 3/1994 | |
| EP | 1273643 | | 8/2003 | |
| EP | 2246403 | A1 * | 11/2010 | ............ C09J 201/00 |
| JP | 04046982 | | 2/1992 | |

OTHER PUBLICATIONS

Trauner, H. Supplementary European Search Report dated Jul. 4, 2012.
International Search Report and Written Opinion in Application PCT/US10/027315 dated Jun. 30, 2010.
Advisory Action for U.S. Appl. No. 12/724,015 dated Dec. 10, 2014.
Final Office Action for U.S. Appl. No. 12/724,015 dated Feb. 25, 2013.

(Continued)

*Primary Examiner* — Karuna P Reddy
(74) *Attorney, Agent, or Firm* — Gardner Groff Greenwald & Villanueva, PC

(57) ABSTRACT

Described herein are adhesives that exhibit good cohesive and tack properties. In certain aspects, the adhesives can be applied to substrates using a low- or medium-pressure delivery system. The adhesives can be readily applied to any substrate such as, for example, a floor, wall, ceiling, countertop, and the like. The adhesives are particularly effective in adhering heavy materials such as, for example ceramic tiles and wall panels to walls.

7 Claims, No Drawings

(56) References Cited

OTHER PUBLICATIONS

Final Office Action for U.S. Appl. No. 12/724,015 dated Jul. 8, 2014.
Final Office Action for U.S. Appl. No. 12/724,015 dated Apr. 14, 2016.
Office Action for U.S. Appl. No. 12/724,015 dated Jul. 19, 2012.
Office Action for U.S. Appl. No. 12/724,015 dated Dec. 11, 2013.
Office Action for U.S. Appl. No. 12/724,015 dated Sep. 29, 2015.

* cited by examiner

MULTI-PURPOSE ADHESIVES AND METHODS OF MAKING AND USING THEREOF

CROSS REFERENCE TO RELATED APPLICATIONS

This is a divisional application of U.S. application Ser. No. 12/724,015, filed on Mar. 15, 2010, which claims priority upon U.S. provisional application Ser. No. 61/160,472, filed Mar. 16, 2009. These applications are hereby incorporated by reference in their entireties for all of their teachings.

BACKGROUND

In general, adhesives used to secure building materials involve applying the adhesive to a substrate by trowel or some other spreading means. Although this may be useful in small areas, if the adhesive has to be applied to a large area such as a floor or wall, then the application of the adhesive may not be straightforward and efficient. Thus, adhesives that can be effectively applied to substrates in an even and consistent manner are desirable.

One approach involves the use of pressurized adhesive systems for applying an adhesive to a substrate. Although the use of these systems provides an easy way to apply the adhesive over a large surface area, there are some considerations when using these systems. Traditional adhesive systems for packaging into a pressurized container such as an aerosol can or propane type cylinder have been solvent-based compounds because of good solubility, low cost, solvency in standard pressure propellant systems such as propane, butane, and isobutene compounds and blends thereof, and in some cases high pressure propellant systems such as nitrogen and carbon dioxide. The majority of these traditional systems usually contain at least some VOCs or some level of flammability. Solvent-based systems also usually carry with them a number of undesirable health hazards, environmental concerns, or even the possibility of being explosive in nature. As local, state and national governmental regulations have been tightening the requirements for adhesives and other chemical-based products to contain less VOC and to be more environmentally friendly, it has become necessary to research more environmentally friendly alternatives to adhesives.

Another issue involves the ability of the adhesive to adhere heavy building materials such as, for example, ceramic tiles, to walls. The adhesive should possess good cohesion and strength, which is useful in adhering large materials to walls. However, the strength or cohesive properties of the adhesive has to be balanced with its tack properties. If the adhesive has very good strength characteristics but poor tack properties, then the adhesive is not very effective. The same applies if the adhesive has good tack properties but poor strength.

SUMMARY

Described herein are adhesives that exhibit good cohesive and tack properties. In certain aspects, the adhesives can be applied to substrates using a low- or medium-pressure delivery system. The adhesives can be readily applied to any substrate such as, for example, a floor, wall, ceiling, countertop, and the like. The adhesives are particularly effective in adhering heavy materials such as, for example ceramic tiles and wall panels to walls.

The advantages of the materials, methods, and devices described herein will be set forth-in part in the description which follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present materials, articles, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

The amount of each component unless expressed otherwise is based upon the batch adhesive composition. For example, if a polymer is from 5% to 70% by weight of the composition, it is 5% to 70% by weight of the adhesive prior to the addition of other components such as, for example, a propellant.

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not. For example, the adhesives described herein may optionally contain one or more fillers, where the filler may or may not be present.

Described herein are adhesive compositions that can be used in a variety of different applications. In one aspect, the adhesive composition comprises a mixture of:

(a) a first polymer comprising a glass transition temperature greater than 15° C.;
(b) a second polymer comprising a glass transition temperature less than 0° C.; and
(c) a plasticizer.

Each component of the adhesive composition as well as methods for making and using the adhesive compositions is described below.

The first polymer provides cohesive and strength properties to the adhesive composition. In general, the first polymer is composed of one or more polymers having a relatively high glass transition temperature ($T_g$). Thus, the first polymer is a "hard" polymer, which requires higher temperatures to soften the polymer relative to the second polymer. In certain aspects, it is desirable that the first polymer absorb little to no water. This is particularly useful when applied to substrates such as, for example, drywall, where the presence of water can generate mold and compromise the drywall.

In one aspect, the first polymer has a glass transition temperature greater than 15° C. In another aspect, the glass transition temperature is from 15° C. to 25° C. or from 20° C. to 25° C. In further aspects, the glass transition temperature of the first polymer is 15° C. 16° C. 17° C., 18° C. 19° C., 20° C., 21° C., 22° C., 23° C., 24° C., or 25° C., where any value can form a lower and upper end-point of a temperature range.

A variety of different polymers can be used as the first polymer. For example, the first polymer can be derived from monomers such as (meth)acrylic acid, C1 to C8 alkyl (meth)acrylate, C1 to C13 hydroxyalkyl(meth)acrylate, di-C1 to C13 alkyl maleate/fumarate, vinyl ester such as vinyl acetate, styrene, butadiene, 2-chloro-1,3-butadiene, and ethylene. In one aspect, the first polymer comprises a styrene acrylic latex polymer. Examples of such polymers include, but are not limited to, Acronal 296D (copolymer dispersion of butyl acrylate and styrene), Acronal S 702 (acrylic-styrene copolymer anionic dispersion), and Acronal S 728 (copolymer of styrene-butyl acrylate aqueous dispersion), which are manufactured by BASF. Another example includes Saiden SA-207 (styrene acrylic) manufactured by Saiden Technologies. In other aspects, the first polymer is a polyester polyurethane such as, for example, a carboxylated or sulfonated polyester polyurethane. The amount of first polymer can vary depending upon the application of the adhesive as well as the selection and amounts of other components used to make the adhesive. In one aspect, the first polymer is from 30% to 90% by weight of the composition. In other aspects, the first polymer is from 30% to 80%, 30% to 70%, 30% to 50%, 60% to 80%, or 70% to 80% by weight of the composition.

The adhesive composition also includes a second polymer comprising a glass transition temperature less than 0° C. Due to the lower glass transition temperature, the second polymer is "softer" than the first polymer. Not wishing to be bound by theory, the second polymer provides a good balance of cohesion (i.e., strength) and tackiness. It is also desirable that the second polymer absorb little to no water for the reasons discussed above.

In one aspect, the second polymer has a glass transition temperature from −10° C. to −50° C. or from −30° C. to −40° C. In another aspect, the second polymer has a glass transition temperature less than −30° C. In further aspects, the glass transition temperature of the second polymer is −30° C., −31° C., −32° C., −33° C., −34° C., −35° C., −36° C., −37° C., −38° C., −39° C., −40° C., −41° C., −42° C., −43° C., −44° C., −45° C., −46° C., −47° C., −48° C., −49° C., −50° C., −51° C., −52° C., −53° C., −54° C., −55° C., −56° C., −57° C., −58° C., −59° C., −60° C., −61° C., −62° C., −63° C., −64° C., −65° C., where any value can form a lower and upper end-point of a temperature range.

In one aspect, the second polymer comprises an acrylic based polymer. Examples of second polymers useful herein include, but are not limited to, Acronal V 275 (acrylic-vinyl acetate copolymer emulsion), Acronal 3432 (a dispersion of a carboxylated acrylic polymer), Acronal 210 (an acrylate copolymer emulsion), Acronal A 200, Acronal A 280, Acronal A 323, Acronal A 378, Acronal A 380, and Acronal V 312, which are manufactured by BASF. Others include Saiden Saitak™ 950 (acrylic) and 400™ (acrylonitrile/acrylic copolymer) manufactured by Saiden Technologies and UCAR® latex 163S (acrylic) manufactured by Union Carbide. The amount of second polymer can vary depending upon the application of the adhesive as well as the selection and amounts of other components used to make the adhesive. In one aspect, the second polymer is from 5% to 70% by weight of the composition. In other aspects, the first polymer is from 10% to 70%, 20% to 70%, 30% to 70%, or 40% to 70% by weight of the composition.

In one aspect, the second polymer can include two or more different polymers with varying glass transition temperatures. By selecting the appropriate second polymers, it is possible to vary the cohesive and tack properties of the adhesive composition. In one aspect, the second polymer includes two polymers, where the one of the polymers has a glass transition temperature from −30° C. to −40° C. and the other polymer has a glass transition temperature less than −40° C. or from −40° C. to −65° C. In another aspect, the second polymer includes three polymers, where two of the polymers have a glass transition temperature from −30° C. to −40° C. and the third polymer has a glass transition temperature less than −40° C. or from −40° C. to −65° C. In another aspect, the second polymer can include two or more acrylic based polymers. In certain aspects, the additional second polymer can provide additional tack properties to the adhesive composition. In one aspect, one of the second polymers can be a polymer or copolymer derived from alkyl acrylates such as, for example, n-butyl acrylate or 2-ethylhexyl acrylate. Not wishing to be bound by theory, by using polymers derived from varying amounts of an alkyl acrylate, it is possible vary the softness and, ultimately, the tack properties of the adhesive. In one aspect, the second polymer having a glass transition temperature less than −40° C. includes Acronal 81 D (acrylic copolymer emulsion containing acrylonitrile in the polymer backbone) manufactured by BASF and Saitack® 400 (acrylonitrile/acrylic copolymer) manufactured by Saiden technologies.

In one aspect, the second polymer can include an acrylic/vinyl acetate co-polymer (e.g., Acronal V 275) and a carboxylated acrylic polymer (e.g., Acronal 3432). In this example, the acrylic/vinyl acetate co-polymer provides more cohesion and less tack, and the carboxylated acrylic polymer provides additional tack. In this aspect, when the second polymer is composed of an acrylic/vinyl acetate co-polymer and carboxylated acrylic polymer, the acrylic/vinyl acetate co-polymer can be present in the adhesive in an amount of 40% to 65% by weight and the carboxylated acrylic polymer can be present in an amount from 5% to 15% by weight of the adhesive.

In certain aspects, the adhesive composition can also include one or more plasticizers. Due to the "hardness" of the first polymer (i.e., high glass transition temperature), a plasticizer is used to help soften the first polymer. Thus, the plasticizer helps extend the open time of the adhesive (i.e., the time at which the adhesive is in the open air). In the absence of the plasticizer, the adhesive composition would harden quickly when applied to a substrate. Thus, not only do the adhesive compositions described herein possess good cohesive and tack properties, they also have good open times as well.

In one aspect, the plasticizer comprises a rosin ester. In certain aspects, it is desirable that the rosin ester contain minimal to no VOCs. Thus, in certain aspects, the rosin ester is used as an aqueous based composition. Alternatively, the rosin ester can be a solvent based composition (e.g., packaged in oils or organic solvents). The rosin ester useful herein can be up to 50% solids, 60% solid, 70% solids, 80% solids, 90% solids, or 100% solids. Examples of suitable rosin esters include rosins manufactured by Arizona Chemical sold under the tradenames SYLVAGUM, SYLVALITE, SYLVAROS, or SYLVATAC. Several of these resins are pentaerythritol modified rosin esters. In one aspect, the plasticizer is SYLVATAC® RE 5. In another aspect, the plasticizer includes a benzoate ester. For example, the benzoate ester sold under the tradename Benzoflex® 2088 manufactured by Genovique Specialties can be used herein.

The amount of plasticizer can vary ranging from 0.2% to 15%, 0.2% to 5%, or 0.2% to 2% by weight of the composition. In other aspects, the amount of plasticizer is from 1% to 10%, 2% to 10%, or 5% to 10% by weight of the adhesive composition. In other aspects, the plasticizer can be phthalates such as alkyl benzyl phthalates; adipates including dialkyl adipates; phosphates including alkyl aryl phosphates and triaryl phosphates; alkyl and aryl sulfonamides; and hydrogenated terphenyls. Mixtures of two or more different plasticizers can be used herein. For example, SYLVATAC® RE 5 and Benzoflex® 2088 can be used together to produce the adhesives.

In other aspects, a plasticizer is not needed. In one aspect, the adhesive composition comprises a mixture of:
  (a) a third polymer comprising a glass transition temperature −30° C. to −40° C.; and
  (b) a fourth polymer comprising a glass transition temperature less than −40° C.

Any of the second polymers described above can be used as the third and fourth polymer in this aspect. In one aspect, the fourth polymer has a glass transition temperature from −55° C. to −65° C., −57° C. to −63° C., −59° C. to −61° C., or about −60° C. In another aspect, the third polymer includes an acrylic/vinyl acetate copolymer (e.g., Acronal® V275) and the fourth polymer includes acrylonitrile/acrylic copolymer (e.g., Saitack® 400).

In certain aspects, the adhesive compositions contain minimal to no VOCs. In one aspect, the adhesive compositions prior to combining with a propellant contain nominal to no organic solvents, where the primary solvent is water. Thus, process oils or harmful or hazardous solvents including those that contain VOCs are not a necessary feature. Additional components besides the polymers and plasticizers described above can be used to produce the adhesives described herein. In one aspect, the adhesive further comprises a surfactant, a stabilizer, a defoamer, a filler, a corrosion inhibitor, an antioxidant, a pH adjuster, a formaldehyde scavenger, a biocide, a fungicide, or any combination thereof.

The surfactants useful herein can be cationic, anionic, or non-ionic. In one aspect, the surfactant comprises a fatty acid. Examples of surfactants include soaps, Rohm & Haas Triton B non-ionic X-180, X-193, and X-405; Albright & Wilson Ltd. Empilan MAA fatty acid non-ionic and NP-S non-ionic; Modical® S manufactured by Henkel Corporation, which is a sulfated fatty acid that is an anionic surface-active agent. In one aspect, the surfactant is from 0.05 to 5%, or from 0.1 to 2% by weight of the adhesive.

Suitable stabilizers include, but are not limited to, basic pH materials, such as caustic soda, caustic potash, ammoniated tallow, dimethyl amine, dimethyl amine, ammonia, dimethyl amino ethanol, urea, diethanolamine, triethanolamine, or morpholine. The stabilizer makes the adhesive overall more stable and ready to be mixed with the additional constituent components to form a stable high solids adhesive. In one aspect, the stabilizer is caustic potash (KOH 45%) manufactured by Vulcan Performance Chemicals. In one aspect, the stabilizer is from 0.1 to 1.0%, from 0.1 to 0.3%, or 0.25% by weight of the adhesive. In other aspects, freeze-thaw stabilizers can be used herein. Freeze-thaw stabilizers are known in the art for preventing the freezing of the adhesives at reduced temperatures, which prevents the different polymers present in the adhesive from separating into different phases. In the case when freeze-thaw stabilizers are used, they can be up to 20% by weight of the adhesive. In another aspect, the amount of freeze-thaw stabilizer is from 0.5% to 20%, 0.5% to 15%, 0.5% to 10%, 1% to 10%, 2% to 10%, 3% to 10%, 4% to 10%, or 5% to 10% by weight of the adhesive.

The defoamer reduces foam formation during processing as well as foam formation that can occur once the adhesive formulation is dispensed from the canister. Suitable defoamers include, but are not limited to, Foamkill 600 Series, available from Crucible Chemical; Foammizer M-55, available from C. P. Hall; and Nalco 5770 and 5772, available from Nalco Chemical, etc. A bactericide such as, for example, Amerstate 251, available from Drew Chemical, can be added to reduce foaming and microbial contamination. In one aspect, Foamaster® 111 manufactured by Henkel Corporation can be used, which is a non-silicone based defoamer. In one aspect, the defoamer is from 0.1 to 1.0%, from 0.1 to 0.5%, of 0.3% by weight of the adhesive.

The filler is used as a thickener, which provides body to the adhesive composition. Care should be taken not to raise the viscosity to a level that will prevent the use of the adhesive in aerosol form or in a pressurized canister dispenser. Suitable fillers include, but are not limited to, clays. In one aspect, RC-32 clay slurry manufactured by Thiele Kaolin Company can be used. In one aspect, the filler is from 1 to 15%, from 5 to 10%, or from 8 to 10% by weight of the adhesive.

An antioxidant prevents corrosion of the inner surface of the mixer and containers holding the adhesive formulation caused by oxidation of the metal surface. Antioxidants useful herein include Wing L manufactured by Phoenix Chemical Company, Inc. Wing L is the reaction product between 4-methyl-phenol, dicyclopentadiene, and isobutylene. In one aspect, the antioxidant is from 0.1 to 2%, from 0.1 to 1%, or from 0.5 to 1% by weight of the adhesive. A corrosion inhibitor in combination with the antioxidant can also be used to prevent corrosion of the inner liner of the mixer and other containers caused by components present in the adhesive (e.g., acrylics).

A biocide can be used to prevent the formation of microorganisms (e.g., bacteria) that can grow over time in the adhesive composition. In one aspect, the biocide is Rocima BT 2S biocide manufactured by Rohm and Haas, which is composed of dipropylene glycol, benzisothiazolin-3-one, water, and sodium hydroxide. In one aspect, the biocide is from 0.01 to 0.3%, from 0.05 to 0.2%, or from 0.1 to 0.2% by weight of the adhesive.

In another aspect, a fungicide useful in killing mold and fungi can be incorporated into the adhesives.

A pH adjuster/formaldehyde scavenger is a complexing or sequestering agent that reacts with aldehyde(s) present in the adhesive composition. In one aspect, the pH adjuster/formaldehyde scavenger is AMP 95® manufactured by ANGUS Chemical Company, which is composed of 2-amino-2-methyl-1-propanol. In one aspect, the pH adjuster/formaldehyde scavenger is from 0.1 to 2%, from 0.1 to 1%, or from 0.5 to 1% by weight of the adhesive.

In one aspect, the adhesive can include hydrocarbons (e.g., paraffin) or mineral oils. In general, the adhesives described herein have very high tack properties; however, in certain aspects, it may be desirable to reduce the tack properties and increase the releasability of the adhesive. Not wishing to be bound by theory, the hydrocarbons or oils can accomplish this. In one aspect, the amount of hydrocarbon or oil incorporated into the adhesive is from 0.5 to 5% weight.

In one aspect, the adhesive composition comprises a first polymer comprising a styrene acrylic latex polymer (e.g., Acronal 296), the second polymer comprises (1) an acrylic/vinyl acetate co-polymer (e.g., Acronal 275) and (2) a carboxylated acrylic polymer (e.g., Acronal 3432), and the plasticizer comprises a rosin ester (e.g., SYLVATEC RE-5). In another aspect, the adhesive composition comprises a first polymer comprising a styrene acrylic latex polymer (e.g., Acronal 296) in the amount from 39 to 41%, 39.5 to 40.5%, or about 40% by weight of the adhesive, a second polymer comprising (1) an acrylic/vinyl acetate co-polymer (e.g., Acronal 275) in the amount from 45 to 47%, 45.5 to 46.5%, or about 46% by weight of the adhesive and (2) a carboxylated acrylic polymer (e.g., Acronal 3432) in the amount from 11 to 13%, 11.5 to 12.5%, or about 12% by weight of the adhesive, and a plasticizer (e.g., SYLVATEC RE-5) in the amount from 0.5 to 1.5% or about 1% by weight of the adhesive (e.g., adhesive A in Examples). In these aspects, the adhesive compositions are particularly useful for adhering ceramic tiles to walls and floors.

In another aspect, the adhesive composition comprises a first polymer comprising a styrene acrylic latex polymer (e.g., Saiden-207), the second polymer comprises (1) an acrylic/vinyl acetate co-polymer (e.g., Acronal 275) and (2) a carboxylated acrylic polymer (e.g., Acronal 3432), and the plasticizer comprises a benzoate ester (e.g., Benzoflex® 2088). In another aspect, the adhesive composition comprises a first polymer comprising a styrene acrylic latex polymer (e.g., Saiden-207) in the amount from 29 to 31%, 29.5 to 30.5%, or about 30% by weight of the adhesive, a second polymer comprising (1) an acrylic/vinyl acetate co-polymer (e.g., Acronal 275) in the amount from 53 to 56%, 54% to 55%, or about 54.5% by weight of the adhesive and (2) a carboxylated acrylic polymer (e.g., Acronal 3432) in the amount from 4 to 6%, 4.5 to 5.5%, or about 5% by weight of the adhesive, and a plasticizer (e.g., Benzoflex® 2088) in the amount from 8% to 12%, 9% to 11%, or about 10% by weight of the adhesive (e.g., adhesive B in Examples). In these aspects, the adhesive compositions are particularly useful for adhering sheet vinyl (e.g., heterogeneous linoleum) to walls and floors.

In the formulation above, the first polymer (Saiden-207) has a lower viscosity compared to other first polymers such as Acronal 296. In the case of ceramic tiles, it is desirable that the first polymer Acronal 296 be thicker in order to provide more body to the adhesive. In general, ceramic tiles have grooves on the back-side. The greater body the adhesive has the more the grooves of the tile come into contact with the adhesive, which enhances the performance of the adhesive. In the case of vinyl sheets, it is desirable that the adhesive be thinner so that a thin layer can be easily applied to the wall or floor with little to no body.

In another aspect, the adhesive composition comprises a first polymer comprising a styrene acrylic latex polymer (e.g., Saiden-207) in the amount from 70 to 80% or 74 to 75% by weight of the adhesive, a second polymer comprising an acrylic (e.g., UCAR® latex 163S) in the amount from 5 to 15%, 10 to 15% or 11 to 12% by weight of the adhesive, and a plasticizer (e.g., SYLVATEC RE-5) in the amount from 5 to 15%, 5 to 10%, or 7 to 8% by weight of the adhesive (e.g., adhesive C in Examples). In these aspects, the adhesive compositions are particularly useful for adhering laminates to walls and floors.

In a further aspect, the adhesive composition comprises a third polymer comprising an acrylic/vinyl acetate copolymer (e.g., Acronal® V275) in the amount from 40 to 60%, 45 to 55%, or about 50% by weight of the adhesive and the fourth polymer comprising an acrylonitrile/acrylic copolymer (e.g., Saitack® 400) in the amount from 40 to 60%, 45 to 55%, or about 50% by weight of the adhesive (e.g., adhesive D in Examples). In these aspects, the adhesive compositions are particularly useful for adhering panels such as, for example, fiber reinforced plastics to walls and floors.

In another aspect, the adhesive composition comprises a first polymer comprising a styrene acrylic latex polymer (e.g., Saiden-207), the second polymer comprises (1) an acrylic/vinyl acetate co-polymer (e.g., Acronal 275), (2) a carboxylated acrylic polymer (e.g., Acronal 3432), (3) an acrylonitrile/acrylic copolymer (e.g., Saitack® 400), and the plasticizer comprises a mixture of benzoate ester (e.g., Benzoflex® 2088) and rosin ester (e.g., SYLVATEC RE-5).

In another aspect, the adhesive composition comprises a first polymer comprising a styrene acrylic latex polymer (e.g., Saiden-207) in the amount from 29 to 31%, 29.5 to 30.5%, or about 30% by weight of the adhesive, a second polymer comprising (1) an acrylic/vinyl acetate co-polymer (e.g., Acronal 275) in the amount from 19 to 23%, 20% to 22%, or about 21% by weight of the adhesive, (2) a carboxylated acrylic polymer (e.g., Acronal 3432) in the amount from 14 to 18%, 15 to 17%, or about 16% by weight of the adhesive, (3) an acrylonitrile/acrylic copolymer (e.g., Saitack® 400) in the amount from 23 to 27%, 24 to 26%, or about 25% by weight of the adhesive and a first plasticizer (e.g., Benzoflex® 2088) in the amount from 2% to 5%, 3% to 4%, or about 3.5% by weight of the adhesive and a second plasticizer (e.g., SYLVATEC RE-5) in the amount from 0.1% to 2%, 0.1% to 1%, or about 0.5% by weight of the adhesive (e.g., adhesive E in Examples). In these aspects, the adhesive compositions are particularly useful for adhering vinyl materials such as for example VCT and LVT to walls and floors.

In another aspect, the adhesive composition comprises a first polymer comprising a styrene acrylic latex polymer (e.g., Saiden-207), the second polymer comprises (1) an acrylic/vinyl acetate co-polymer (e.g., Acronal 275), (2) a carboxylated acrylic polymer (e.g., Acronal 3432), (3) an acrylonitrile/acrylic copolymer (e.g.,Saitack® 400), and the plasticizer comprises a mixture of benzoate ester (e.g., Benzoflex® 2088) and rosin ester (e.g., SYLVATEC RE-5).

In another aspect, the adhesive composition comprises a first polymer comprising a styrene acrylic latex polymer (e.g., Saiden-207) in the amount from 21 to 25%, 23 to 24%, or about 23.5% by weight of the adhesive, a second polymer comprising (1) an acrylic/vinyl acetate co-polymer (e.g., Acronal 275) in the amount from 19 to 23%, 20% to 22%, or about 21% by weight of the adhesive, (2) a carboxylated acrylic polymer (e.g., Acronal 3432) in the amount from 18 to 20%, 19 to 21%, or about 20% by weight of the adhesive, (3) an acrylonitrile/acrylic copolymer (e.g.,Saitack® 400) in the amount from 24 to 28%, 25 to 27%, or about 26% by weight of the adhesive and a first plasticizer (e.g., Benzoflex® 2088) in the amount from 1% to 3%, 1.5% to 2.5%, or about 2% by weight of the adhesive and a second plasticizer (e.g., SYLVATEC RE-5) in the amount from 0.1% to 2%, 0.1% to 1%, or about 0.5% by weight of the adhesive (e.g., adhesive F in Examples). In these aspects, the adhesive compositions are particularly useful for adhering vinyl materials such as for example VCT and LVT to walls and floors.

In other aspects, the adhesive is composed of a single pressure sensitive adhesive having a glass transition temperature less than −20° C., or from −20° C. to −40° C., or −20° C. to −30° C. For example, acrylic emulsions such as Rhoplex™ N-619 manufactured by Rohm and Haas can be used herein. The adhesive in this aspect can contain any of the optional components and additives described above (e.g., a biocide).

The adhesive compositions described herein can be produced without the need of special equipment or handling. In one aspect, the method involves
 a. heating a plasticizer for a sufficient time and temperature to decrease the viscosity;
 b. admixing the plasticizer with a first polymer comprising a glass transition temperature greater than 15° C. to produce a first admixture; and
 c. admixing a second polymer comprising a glass transition temperature less than 0° C. to produce the adhesive.

Depending upon the selection and amount of plasticizer, the plasticizer is heated for a sufficient time and temperature such that the plasticizer can be poured. For example, when the plasticizer is SYLVATEC RE-5, the rosin ester is heated from 80-100° F. After the plasticizer has been heated for a sufficient time and temperature, the plasticizer is added to the first polymer to produce a first admixture. The first polymer and plasticizer are mixed for a sufficient time in order to produce a homogeneous mixture. To the first admixture, optional components such as, for example, preservatives (e.g., biocides and fungicides) can be added. The second polymer(s) can then be added to the first admixture while stirring to produce the adhesive composition. In the case when two or more second polymers are used, the order can vary. The adhesive composition is for the most part a homogeneous solution.

Although the adhesives described herein can be used as is once formulated, in certain aspects, once the adhesive composition has been prepared, it can be admixed with one or more propellants followed by the introduction into a pressurized delivery device. In one aspect, the propellant is a single propellant system, which is defined herein as only one propellant alone or with at most a nominal amount of second propellant (e.g., an inert gas). Thus, in this aspect, the propellant does not contain a significant amount of second propellant. The propellant can be any material typically used in aerosol applications, including fluorocarbons. In one aspect, the propellant is HFC 134A (1-1-1-2 tetrafluoroethane), which is a non-polluting and non-flammable propellant. Additionally, HFC 134A is exempt from the list of VOC; therefore, HFC 134A is not a VOC as defined herein. In another aspect the propellant can be an inert gas like nitrogen, argon or carbon dioxide. In one aspect, the propellant can be a hydrocarbon gas, a hydrofluoroalkane or hydrofluoroalkene, or volatile organic compounds such as, for example, dimethyl ether.

The amount of propellant that can be used will vary depending upon the composition of the adhesive, the internal volume of the pressurized container, and the rate of mixing between the adhesive and propellant. In one aspect, the amount of propellant introduced into the pressurized delivery device produces a vapor pressure between 30 to 160 at 72° F., between 50 to 160 at 72° F., between 60 to 120 at 72° F., between 60 to 90 at 72° F., or between 65 to 80 psi at 72° F.

In another aspect, the adhesive formulation is from 10 to 90% by weight of adhesive and from 10 to 90% by weight propellant, from 60 to 90% by weight of adhesive and from 10 to 40% by weight propellant, or from about 80% by weight adhesive and from about 20% by weight propellant. The adhesive compositions can be packaged in an industry standard pressurized delivery device such as, for example, aerosol cans or propane type cylinders fitted with a suitable valve system and nozzle. Depending upon the type and amount of propellant used, the propellant can also act as a solvent, where it can dilute or thin the adhesive.

The adhesive compositions possess good release and spray properties when dispensed from the pressurized delivery device. The compositions maintain a relatively low internal pressure in the pressurized delivery device, which is desirable with respect to releasing the adhesive from the device in a consistent and even manner. In one aspect, spray out pressure fluctuation is between 0-60 psi at 72° F., preferably between 0-10 psi at 72° F.

The adhesive compositions described herein can be sprayed in the form of a stable foam that can be applied to a substrate at varying thicknesses (e.g., up to 0.25 inches). Upon coating a material or substrate, the foam then returns to its original density upon the application of pressure. The conversion of the adhesive from high density to low density is achieved when the adhesive is sprayed out in a uniform manner on the surface, forming a stable bubble structure. The bubble structure maintains and retains a low-density coating of adhesive until another substrate is applied with pressure. Additionally, the bubble structure allows far greater surface coverage than traditional adhesives and excellent, if not superior, bonding strength for many laminates such as, natural or synthetic fabric or textiles, wood, plastic, vinyls, Formica (i.e, a composite composed of a plastic laminate of paper or fabric with melamine resin), metals, rubber, fiberglass, concrete, paper, glass, wall tile, wall panels (e.g., FRP), wall covering materials (e.g., wall paper), and many more surfaces. Additionally, the adhesive formulations are useful in adhering flooring materials such as, for example, carpet, sheet vinyl (e.g., linoleum), vinyl composite tiles, ceramic tiles, artificial grass, wood, marble and other such materials that exist for floor covering and apply them to such substrates as wood, concrete and others.

The adhesives are particularly useful in adhering heavy materials to walls such as ceramic tiles. In one aspect, the adhesives can adhere a 4 in×4 in, a 6 in×6 in, a 12 in×12 in, or a 20 in×20 in tile to a wall. The combination of the increased cohesive and tack properties of the adhesives permits easy installation of large, heavy tiles to walls. The high tack properties of the adhesive provide the initial quick grab of the tile. Thus, once the adhesive has been applied to the wall and the tile placed on the adhesive, the tile will remain on the wall without the installer having to hold the tile in place. The cohesive properties of the adhesive provide a strong bond with the wall once the adhesive has dried.

In other aspects, adhesives described herein are useful with homogeneous linoleum, which are materials composed of the same vinyl material and not layers of different materials. For example, pressure sensitive adhesives with glass transition temperatures less than −20° C., or from −20° C. to −40° C., or −20° C. to −30° C. can be used to adhere homogeneous linoleum to a substrate. For example, acrylic emulsions such as Rhoplex™ N-619 manufactured by Rohm and Haas can be used herein. The adhesive in this aspect is a single polymer, and can contain any of the optional components and additives described above (e.g., a biocide).

The adhesive compositions described herein possess additional advantages besides high tack and cohesive properties. The adhesives are highly water-resistant when dry. Additionally, the adhesives resist breakdown when adhered to high alkaline substrates such as concrete. Yet another advantage is that once the adhesive is allowed to tack and the material that is to be bonded is set in place with pressure, there is no slip from the adhered surface. In other words, the adhesives described herein possess high shear strength.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Preparation of Adhesives

Adhesive A

The following procedure was used to prepare adhesive A (100 lbs):
1. Acronal 296D (40 lbs) was pumped into a tank with a mixing blade, and the mixing blade was set to high.
2. Sylvatec RE5 (1 lb) was heated to 80° F., then slowly added to the tank containing Acronal 296D. The mixture was subsequently mixed for 10 minutes.
3. Rocima BT 2S microbicide (1 lb) was added to the tank.
4. Acronal 3432 (12 lbs) was added to the tank, and the mixture was mixed for 5 minutes.
5. Acronal V-275 (40 lbs) was added to the tank, and the mixture was mixed for 30 minutes.

Adhesive A has a pH from 5.8 to 7.4 at 70° F., a viscosity of 400 to 1,000 cps at 70° F., and a solids content from 59% to 64%. In an exemplary embodiment, adhesive A (506 g) can be formulated with the propellant HFC 134A (169 g).

Adhesive B

The following procedure was used to prepare adhesive B (100 lbs):
1. Saiden 207 (30 lbs) was pumped into a tank with a mixing blade.
2. Benzoflex 2088 (10 lbs) was pumped into the tank. The mixture was subsequently mixed for 20 minutes.
3. Sift Rocima BT 2S microbicide (1 lb) slowly in the tank, then mix for 15 minutes.
4. Acronal 3432 (5 lbs) was added to the tank.
5. Acronal V-275 (54 lbs) was added to the tank, and the mixture was mixed for 10 minutes.

Adhesive B has a pH from 5.0 to 6.0 at 70° F., a viscosity of 600 to 1,200 cps at 70° F., and a solids content from 60% to 66%. In an exemplary embodiment, adhesive B (495 g) can be formulated with the propellant HFC 134A (165 g).

Adhesive C

The following procedure was used to prepare adhesive C (100 lbs):
1. Saiden 207 (74 lbs) was pumped into a tank with a mixing blade, and the mixing blade was turned on.
2. Benzoflex 2088 (3 lbs) was slowly pumped into the tank. The mixture was subsequently mixed for 5 minutes.
3. Rocima BT 2S microbicide (1 lb) was added to the tank.
4. Carbamide (urea) (3 lb) was added to the tank.
5. Ucar Latex 163 S (3 lb) was added to the tank.
6. Sylvatec RE5 (7 lb) was added to the tank.
7. The mixture was mixed for 10 minutes.

Adhesive C has a pH from 7.5 to 8.5 at 70° F., a viscosity of 600 to 1,200 cps at 70° F., and a solids content from 60% to 66%. In an exemplary embodiment, adhesive C (468 g) can be formulated with the propellant HFC 134A (156 g).

Adhesive D

The following procedure was used to prepare adhesive D (100 lbs):
1. Saitack® 400 (49.9 lbs) was pumped into a tank with a mixing blade, and the mixing blade was turned on.
2. Acronal V-275 (49.6 lbs) was added to the tank, and the mixture was mixed for 10 minutes.
3. Rocima BT 2S microbicide (0.5 lb) was added to the tank, and the mixture was mixed for 10 minutes.

Adhesive D has a pH from 4.2 to 5.0 at 70° F., a viscosity of 300 to 800 cps at 70° F., and a solids content from 61% to 66%. In an exemplary embodiment, adhesive C (510 g) can be formulated with the propellant HFC 134A (145 g).

Using similar procedures described above, adhesives D and E were prepared as well (all amounts in weight %).

| Adhesive E | |
| --- | --- |
| SA 207 | 30 |
| S400 | 25.3 |
| Benzoflex 2088 | 3.5 |
| Sylvatac RE5 | 0.5 |
| Acronal V-275 | 21 |
| Rocima BT 2S Microbicide | 0.8 |
| Urea | 2.5 |
| Disperbyk 187 | 0.4 |
| Acronal 3432 | 16 |

| Adhesive F | |
| --- | --- |
| SA 207 | 23.60 |
| S400 | 26.25 |
| Benzoflex 2088 | 2.20 |
| Sylvatac RE5 | 0.56 |
| Acronal V-275 | 21.13 |
| Rocima BT 2S Microbicide | 0.9 |
| Urea | 1.80 |
| Disperbyk 187 | 0.46 |
| Acronal 3432 | 20 |
| VPCL-609 | 3.11 |

Performance Testing

The ANSI A136.1 test was used to evaluate the performance of adhesive A. Adhesive A was sprayed on the back of 4¼×4¼ wall tile. The adhesive was sprayed until there was consistent coverage and then allowed to become tacky for 10 minutes. After 10 minutes a second wall tile was applied to the first tile, leaving a ¼ inch offset. Pressure was applied by hand before a 15 lb weight was set on top. The weight remained on the surface for 3 minutes. There were no spacers used. The bond assemblies were cured as listed below. Table 1 summarizes the test results.

TABLE 1

| TEST/DESIGNATION | EVALUATION | ANSI SPECIFICATION |
|---|---|---|
| Shear Strength, 7-Day | 82 psi | 50 PSI |
| Shear Strength Wet, Type I | 6 psi | 50 PSI |
| Shear Strength Wet, Type II | 9 psi | 20 PSI |
| Shear Strength 28 Days | 70 psi | 50 PSI |
| Accelerated Aging | 81 psi | Not less than 75% of 7-day shear value |
| Heat Resistance | Maintained load for 24 hrs | "Tile assembly shall maintain a 10 lb. static load in shear without failure for 24 hrs. |
| 9 Impact Test | All tiles remained bonded. | "All tiles must remain bonded after impact" |
| Stain Test | 0% penetration | "Staining shall not exceed 70% penetration" |
| Test for Mold Growth | Did not support mold growth | "Adhesive shall not mold growth" |

As summarized in Table 1, adhesive A exhibited many desirable properties such as high shear strength, heat resistance, stain resistance, and mold resistance. These features are particularly desirable when using the adhesive in numerous flooring applications where the flooring and adhesive can be exposed to harsh conditions on a continuous basis.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

The invention claimed is:

1. A method for adhering a flooring material to a floor comprising (a) spraying an adhesive consisting of a mixture of (i) an emulsion of water and a copolymer consisting of butyl acrylate and isobutyl acrylate having a glass transition temperature from −20° C. to −30° C., a dynamic viscosity of 350 mPa·s to 800 mPa·s, a solids content of 56% by weight to 58% by weight, and optionally a stabilizer, a defoamer, a filler, a biocide, a fungicide, a preservative, a hydrocarbon, mineral oil, or any combination thereof, wherein the emulsion is from 45% to 85% by weight of the aqueous-based adhesive, and (ii) a propellant to the substrate to produce a coated floor, and (b) applying the flooring material to the coated floor.

2. The method of claim 1, wherein the flooring material comprises carpet, carpet padding, athletic surfaces, vinyl composite tile (VCT), vinyl tile, resilient sheet goods, ceramic tile, wood flooring, synthetic flooring material, cove base, a laminate, sheet vinyl, or floor covering padding.

3. The method of claim 1, wherein the floor comprises Styrofoam, textile fabrics, natural and synthetic fibers, Formica, wood, metals, fiberglass, concrete, sheet rock, masonry materials, plastic, vinyl, glass, leather, or rubber.

4. The method of claim 1, wherein the flooring material is sheet vinyl.

5. The method of claim 4, wherein the sheet vinyl is linoleum.

6. The method of claim 1, wherein the propellant is from 10% to 90% by weight of the adhesive.

7. The method of claim 1, wherein the propellant is from 10% to 20% by weight of the adhesive.

* * * * *